United States Patent [19]
Cornett, Sr. et al.

[11] Patent Number: 6,161,339
[45] Date of Patent: Dec. 19, 2000

[54] STRUCTURAL TIE-DOWN APPARATUS

[75] Inventors: Robert M. Cornett, Sr.; Robert M. Cornett, Jr.; Alan Woehlk; Norman Crumpler, all of Tampa, Fla.

[73] Assignee: Hurri-Bolt Inc., Tampa, Fla.

[21] Appl. No.: 09/166,336

[22] Filed: Oct. 5, 1998

Related U.S. Application Data

[60] Provisional application No. 60/098,008, Aug. 26, 1998.

[51] Int. Cl.[7] .............................. E04H 9/14; E02D 27/50; E04D 13/00
[52] U.S. Cl. ................................. 52/23; 52/92.2; 52/291; 52/293.3; 52/295; 52/643; 52/223.13; 52/223.14; 52/741.3; 52/745.21
[58] Field of Search .................................. 52/23, 4, 92.1, 52/92.2, 92.3, 93.1, DIG. 11, 293.3, 295, 643, 291, 223.13, 223.14, 223.6, 741.3, 745.21

[56] References Cited

U.S. PATENT DOCUMENTS

| | | | |
|---|---|---|---|
| 573,452 | 12/1896 | Delahunt | 52/92.2 |
| 766,943 | 8/1904 | Fisher | 52/92.1 |
| 932,118 | 8/1909 | Gerhardt et al. | 52/291 |
| 950,085 | 2/1910 | West | 52/23 |
| 1,192,027 | 7/1916 | Acheson | 52/23 |
| 1,458,498 | 6/1923 | Piel | 52/291 X |
| 1,466,174 | 8/1923 | Korn | 52/643 X |
| 1,864,403 | 6/1932 | Bradley | 52/23 X |
| 2,548,758 | 4/1951 | Agle | 52/23 X |
| 4,078,353 | 3/1978 | Thesingh . | |
| 4,442,640 | 4/1984 | Gary . | |
| 4,472,916 | 9/1984 | Krebs | 52/23 X |
| 5,355,640 | 10/1994 | Frye . | |
| 5,384,993 | 1/1995 | Phillips . | |
| 5,388,378 | 2/1995 | Frye . | |
| 5,448,861 | 9/1995 | Lawson | 52/92.2 |
| 5,491,935 | 2/1996 | Coxum . | |
| 5,522,184 | 6/1996 | Oviedo-reyes | 52/23 |
| 5,531,054 | 7/1996 | Ramirez . | |
| 5,535,561 | 7/1996 | Schuyler . | |
| 5,537,786 | 7/1996 | Lozier et al. . | |
| 5,570,549 | 11/1996 | Lung et al. . | |
| 5,603,186 | 2/1997 | Zaffino . | |
| 5,623,788 | 4/1997 | Bimberg et al. . | |
| 5,687,512 | 11/1997 | Spoozak et al. . | |
| 5,815,999 | 10/1998 | Williams | 52/92.2 X |

*Primary Examiner*—Laura A. Callo
*Attorney, Agent, or Firm*—David Kiewit

[57] ABSTRACT

An arrangement for anchoring a roof of a building so that it can resist wind forces captures each roof truss, or other roof framing member, under a wire rope passed through a sequence of eyebolts protruding above a top plate of one of the walls of. Each of the eyes is the upper portion of one of a plurality of rod assemblies, each of which is connected to a respective one of a plurality of anchors disposed beneath the wall. A turnbuckle connecting each rod assembly to a respective eyebolt is used to draw the eyebolt down against the top plate and hence apply tension to the wire rope. A connecting nut at the bottom of each rod assembly attaches the rod assembly to a threaded upper end of an anchor set in the foundation of the building. Thus, tightening the turnbuckles firmly ties down the roof to the foundation.

20 Claims, 4 Drawing Sheets

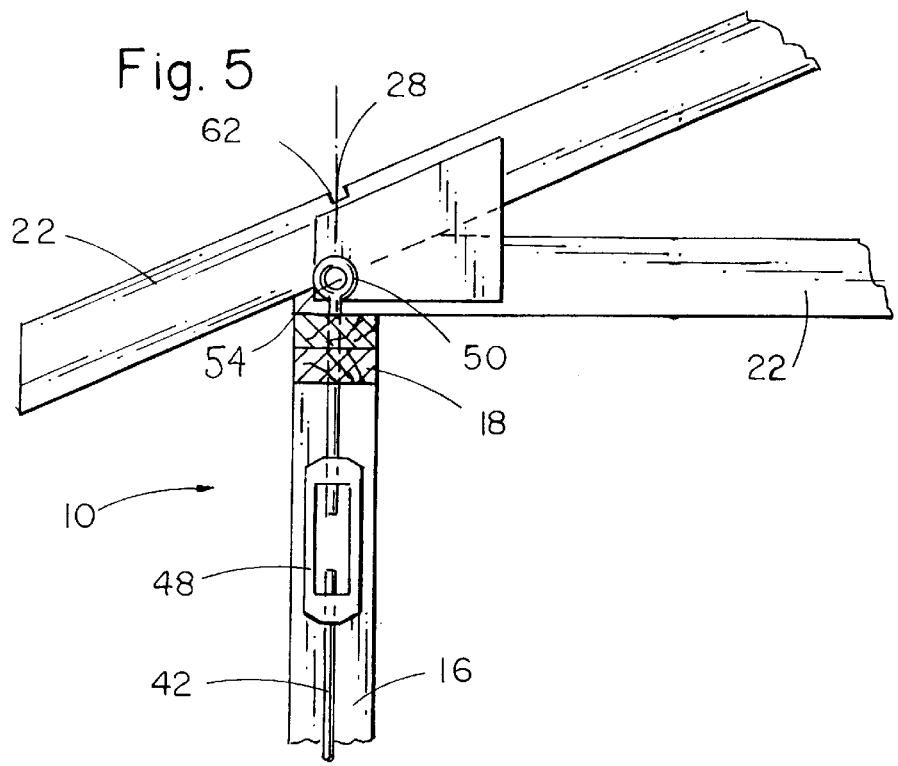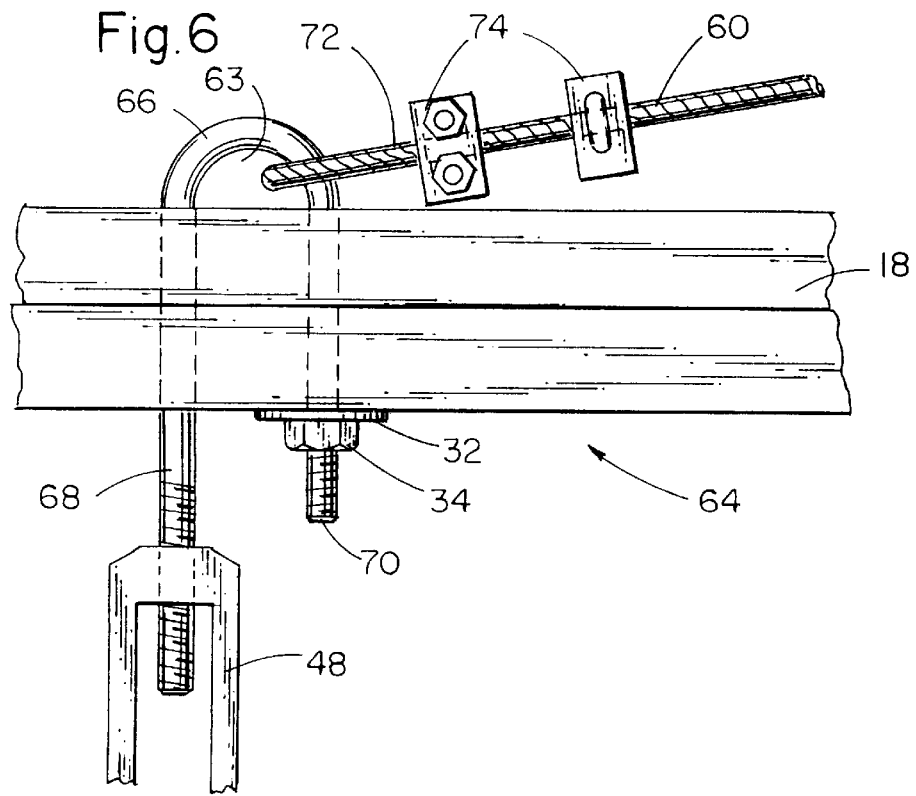

STRUCTURAL TIE-DOWN APPARATUS

CROSS REFERENCE TO RELATED APPLICATIONS

This application claims the priority date of a provisional application for patent filed Aug. 26, 1998 and having Ser. No. 60/098,008, for the disclosure common therewith.

STATEMENT REGARDING FEDERALLY SPONSORED RESEARCH OR DEVELOPMENT

Not Applicable

BACKGROUND OF THE INVENTION

1. Field of the Invention

This invention relates to arrangements for securing the roof of a structure against damage caused by high winds, earthquakes, and the like.

2. Background Information

Perhaps the most widely used approach to "hurricane-proofing" a building employs metal "hurricane straps" nailed across points where two structural members meet. In particular, this approach involves placing a metal strap along the top plate across each truss or other roof framing member and nailing the strap in place with ten or more nails. This approach is approved by the building codes in force in the State of Florida at the time this application was written, but it is very expensive both because of the labor involved in driving the great number of nails that need to be used, and because of the time required to fully inspect the work.

Many workers in the field have suggested approaches to increasing the survivability of a building subjected to high winds, the approaches comprising anchoring the roof to the foundation or to anchors firmly set in the ground adjacent the protected structure. Notable among such approaches are the following U.S. patents:

Spoozak et al., in U.S. Pat. No. 5,687,512, teach a tie-down arrangement that anchors the periphery of a roof. Their arrangement involves drilling a hole through each rafter and threading a cable through the holes and thereby around the house. They provide a bracket at each corner or wall end to allow the cable to turn and go in another direction.

Bimberg et al., in U.S. Pat. No. 5,623,788, disclose a tie-down arrangement installable over a finished roof. Their tie-down provides a grid of retainers across the roof—i.e., same of their retainers run parallel to trusses, and some run perpendicular.

Zaffino, in U.S. Pat. No. 5,603,186, discloses a tie-down arrangement that involves anchoring a metal band to the foundation, running the band up along the outside of a wall and across the roof. He shows his strap penetrating the roof, rather than wrapping around the overhang.

Frye, in U.S. Pat. Nos. 5,388,378 and 5,355,640, discloses a roof tie down arrangement having support rods running perpendicular to the trusses. At the end of a wall section each of these rods is connected to an eye-bolt screwed into a truss, an arrangement not known to be particularly good at resisting horizontal forces directed along the rod. Frye's approach is also unusual in the large number of potentially leaky roof penetrations employed.

Thesingh, in U.S. Pat. No. 4,078,353, teaches an overall approach to building a house. His approach includes, as one of its features, a tie-down arrangement similar to Zaffino's in having a flexible tensile member that penetrates the roof at the outer edge of a wall.

Lozier et al. (U.S. Pat. No. 5,537,786) show a tie-down system of straps run across an already-installed roof. Their approach includes several intermediate retainers (e.g., one at the ridgepole) to hold each of a plurality of the straps in a respective predetermined position and to prevent damage to parts of the roof.

It is also known to reinforce a building wall to resist wind and earthquake damage by the use of what will hereinafter be called a "top plate tie down" arrangement in which a vertically disposed elongate fastening member that can be loaded in tension (e.g., a threaded metal rod) connects a top plate of the protected wall to an anchor disposed beneath the wall. An exemplar arrangement of this sort is made by the Go-Bolt Company of DeLand, Fla. The Go-Bolt apparatus comprises an anchor portion set in position prior to pouring concrete around it, one or more threaded rods interconnected end-to-end so as to reach from the anchor portion to the top frame rail or top plate on a wood-framed wall, and a washer and nut above the top plate so that tightening the topmost nut clamps the top plate rail to the foundation—i.e., an arrangement in which the threaded rod is in tension and the wall studs adjacent the threaded rod are in compression. The basic top plate tie down arrangement for anchoring a wall is compatible with the separate use of hurricane straps, but it does not necessarily provide means for anchoring a truss or other roof framing member disposed above and supported by the top plate. Improvements to the basic top plate tie down arrangement have been taught in a variety of references, some of which describe arrangements for securing trusses to the top plate as well as means of tying the top plate to a foundation or to some other anchor point. Some of the U.S. patents providing teaching in these areas are those of:

Lung et al., in U.S. Pat. No. 5,570,549, who propose the use of special clamps in an otherwise conventional top plate tie down arrangement. These clamps allow Lung et al. to replace the commonly used threaded rods with more widely available and less expensive structural reinforcing rods of the type commonly referred to as "rebar".

Schuyler, in U.S. Pat. No. 5,535,561, teaches the use of a spring in an otherwise conventional top plate tie down arrangement. Schuyler's spring holds tension on the tie down rod in the event that the wall timbers shrink.

Ramirez, in U.S. Pat. No. 5,531,054, teaches the use of tie down rods that are not threaded for their full length. He also teaches an embodiment using a bracket at the top of a tie down rod to clamp a single roof framing member to the top plate. In order for Ramirez's arrangement to clamp all of the roof framing members to the top plate, one tie rod would be required for each such truss or other roof framing member.

Coxum, in U.S. Pat. No. 5,491,935, teaches the use of a special reinforcing bar extending about and cast into the perimeter of a foundation slab and having a first plurality of tee-shaped connectors disposed therealong, each of the first plurality of tee-shaped connectors located immediately beneath a corresponding one of a second plurality of tee-shaped connectors attached to a pipe running above the top plate and passing through each of the rafters of a roof. A vertical tensile connection, comprising threaded pipe and an adjusting coupling, runs between corresponding ones of the first and second plurality of tee-shaped connectors so as to draw the top plate and the rafters downwards towards the foundation.

Phillips, in U.S. Pat. No. 5,384,993, teaches the use of sheet metal brackets disposed over pairs of adjacent trusses to connect those trusses to the top plate. Philips teaches anchoring the top plate to the ground by means of a rod running down through the wall to an anchor buried in the ground beneath the protected building, rather than being set into a foundation.

BRIEF SUMMARY OF THE INVENTION

The invention provides an improved top plate tie down arrangement comprising a plurality of elongate vertical fasteners, a corresponding plurality of anchors disposed beneath the wall and a flexible tensile member running along the top plate, the flexible tensile member running over the top of each of a plurality of roof trusses or framing members transverse to and disposed above the top plate, the flexible tensile member sequentially attached to each of the vertical fasteners by suitable attachment means. Each of the vertical fasteners in the improved arrangement comprises a rod assembly, a topmost portion of which comprises the attachment means (e.g., an eye portion of an eyebolt). This attachment means portion is adapted to engage the flexible tensile member (e.g., a composite wire rope of the type commonly called aircraft cable). This arrangement provides means for changing the lengths of ones of the vertical fasteners (e.g., by means of respective turnbuckles) and thereby applying tension to the flexible tensile member (e.g., by drawing each of a plurality of eyes downward) so that the flexible tensile member retains the captured roof framing members against the top plate.

In a preferred embodiment, each of the rod assemblies is fixedly attached to a foundation by an anchoring means, which preferably comprises the combination of a threaded stud embedded in a concrete foundation and a coupling nut attaching the embedded stud to a lower portion of the rod assembly. The upper end of the rod assembly preferably comprises an eyebolt inserted through a throughhole in a top plate so that the eye of the eyebolt is above the top frame member and so that the lower end of the eyebolt can be attached to another, lower, portion of the rod assembly by means of a turnbuckle.

In a preferred embodiment a strong, flexible tensile member, which preferably comprises a steel cable, is run through the eye of each of a plurality of eyebolts. Intermediate two adjacent eyebolts, the cable is passed over intervening trusses or other structural members (in a preferred embodiment each of the passed-over trusses comprises a notch having a size compatible with that of the cable being used). Thus, when the turnbuckle portions of the rod assemblies interconnected by the flexible tensile member are tightened, the flexible tensile member captures the intervening roof framing members and secures them, by means of the rod assemblies, to the foundation.

At each end of the flexible tensile member (e.g., at an end of a wall being protected by the invention), a cable end clamping arrangement is preferably employed. In a preferred embodiment, the end clamp comprises a special U-bolt having two legs of disparate length and having opposite sense threads on each of the legs. One end of this special U-bolt is attached, like the eyebolts, to a turnbuckle and thereby to the rest of a rod assembly. The other end of the U-bolt extends through a separate throughhole in the top plate and is clamped thereto by a conventional nut and washer.

BRIEF DESCRIPTION OF THE SEVERAL VIEWS OF THE DRAWING

FIG. 5 is a sectional detail of a notched truss as indicated by 5 in FIG. 2.

FIG. 6 is a sectional detailed view of apparatus installed at the end of a wall, the detailed view taken as indicated by 6 in FIG. 1.

DETAILED DESCRIPTION OF THE INVENTION

Figure 1:
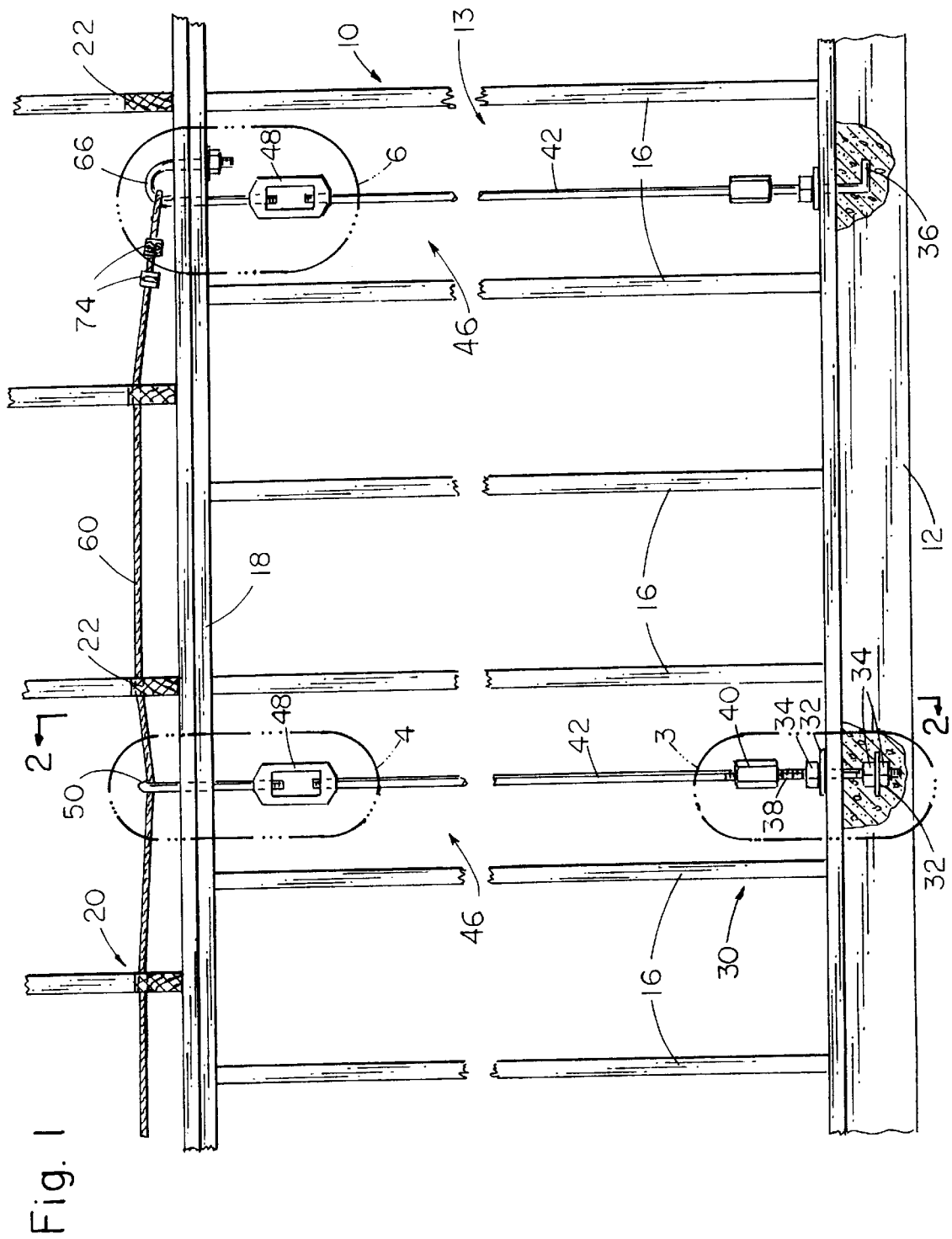
FIG. 1 is an elevational view taken perpendicular to a framed wall and showing a plurality of roof framing members transverse to the wall anchored by apparatus of the invention to a foundation beneath the wall.
Figure 2:
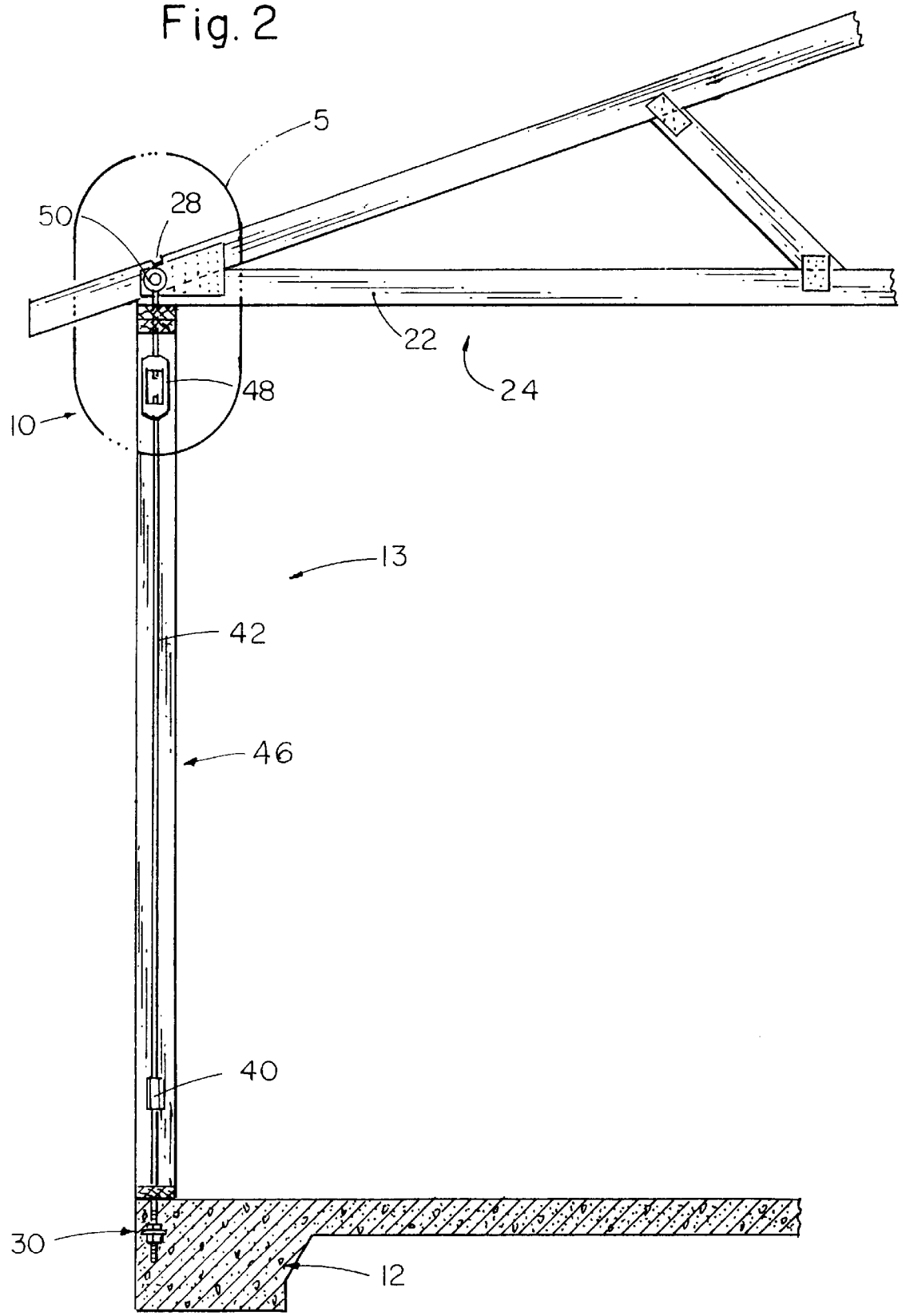
FIG. 2 is an elevational cross section taken as indicated by the double-headed arrow 2—2 in FIG. 1.

Turning now to FIGS. 1 and 2, one finds selected views of a wood framed wall 10 standing on a concrete foundation slab 12, with the improved tie down apparatus 13 of the invention added thereto. The wall 10 may comprise a sill 14 or foot member laid upon the foundation 12 and bolted thereto; a plurality of vertically disposed framing members 16 or studs, and a top plate 18 that is fastened across the top of the studs 16. A roof 20, conventionally supported by the wall 10, comprises a plurality of roof framing members 22 transverse to the wall 10 and above the top plate 18. The roof 20, if of the gabled variety, commonly comprises a plurality of pre-assembled trusses 24, each of which is set upon two top plates of respective load bearing wall. Alternately, the roof 20 may be flat (in which case a plurality of roof joists (not shown) would extend transverse to the wall 10). Or the roof may be of the mansard type, or be of any other known construction type wherein the roof is at least partially supported by an exterior load bearing wall. Moreover, although the preferred embodiment is depicted with reference to a wooden framed wall, other sorts of wall construction may also be employed. For example, a metal framed wall, of the type commonly used in commercial building construction could be employed. So, for that matter, could a concrete block or brick wall having a top plate 18 disposed thereupon. Moreover, although the invention is herein described and depicted with respect to an exterior wall of a building, the same arrangement could clearly be applied to an interior wall crossed by one or more roof member;.

It is conventional in wall construction for a foundation 12 to be made with anchors 30 set therein, and to use these anchors for the purpose of bolting the sill 14 to the foundation 12. One approach to doing this is to insert a plurality of anchors 30 into the wet concrete of the foundation 12 before the concrete has set. Another is to suspend a plurality of anchors from a horizontal board positioned at the top of the pouring frame and to then pour concrete over the suspended anchors. The bottom end of each anchor 30 is configured to extend laterally outwards (e.g., by clamping a washer 32 between two nuts 34, or by providing a elbow-like bent portion 36) so that the anchor 30 can not be pulled out of the foundation 12. The plurality of anchors 30 are spaced out along the centerline 28 of the wall 10, and a corresponding plurality of throughholes are cut into the sill 14 so that when the sill 14 is placed upon the foundation 12 a threaded upper end 38 of a respective anchor 30 projects through each hole. A washer 32 and nut 34 are then put on each anchor 30 in order to secure the sill 14 to the foundation 12. In the preferred embodiment of the present invention, similar arrangements are used, but the anchors 30 are selected to have a threaded upper end 38 projecting somewhat higher above the sill than would be the case for a conventional wall so that a connecting nut 40 can be used to connect each anchor 30 to a respective vertical rod 42 portion of the tie down apparatus 13 of the invention. That is, the anchor 30 of the preferred embodiment serves both the conventional purpose of bolting the sill to the foundation, as well as serving as part of a means of tying the top plate 18 to the foundation 12.

Although the foregoing describes a preferred means of attaching a vertical rod 42 to a foundation 12, it will be clear to those skilled in the art that other approaches to fastening a vertical rod within a wall to an anchor disposed beneath the wall can also be employed. For example, one could use the tie down apparatus of the invention 13 with an anchor 30 set into the ground beneath a wall of a building having a suspended floor construction, as has been taught by Phillips in U.S. Pat. No. 5,384,993, the teaching of which is herein incorporated by reference.

In many cases, such as single floor housing construction, the vertical rod 42 may be a single metal rod threaded on both ends and having an overall length less than the height between the sill 14 and top plate 18 of the wall 10. In multi-story construction, or anywhere else where convenient, the overall rod assembly 42 may comprise a plurality of rods connected end-to-end by means of connecting nuts. It will be recognized by those skilled in the art that other configurations, such as using a cable instead of a rod, or using a rod threaded along its entire length may also be employed in practicing the invention.

In the preferred embodiment the vertical rod has a threaded region 43 on its lower end having a length substantially equal to half the length of a connecting nut 40. In one embodiment the connecting nut 40 is one and one half inches long and a threaded region 43 having a length of three quarters of an inch is provided on the rod. In this case the worker assembling the tie down apparatus 13 is instructed to initially fully thread the connecting nut 40 to the rod 42. The rod 42 is then placed vertically above the anchor 30, and the connecting nut 40 is threaded onto the upper end 38 of the anchor 30 by turning the rod 42. This assures that the same number of threads on each of the two threaded regions 38, 43 are captured by the nut in order to provide the strongest possible connection. Prior art top plate bolting arrangements employing a rod threaded along its entire length do not provide this means of assuring that the rod and anchor are joined in a maximum strength configuration. The prior art arrangement allows a worker to assemble a connection that is acceptable to all outward appearances, but that is seriously weak because only one thread has been engaged on either the rod or the anchor.

Figure 4:
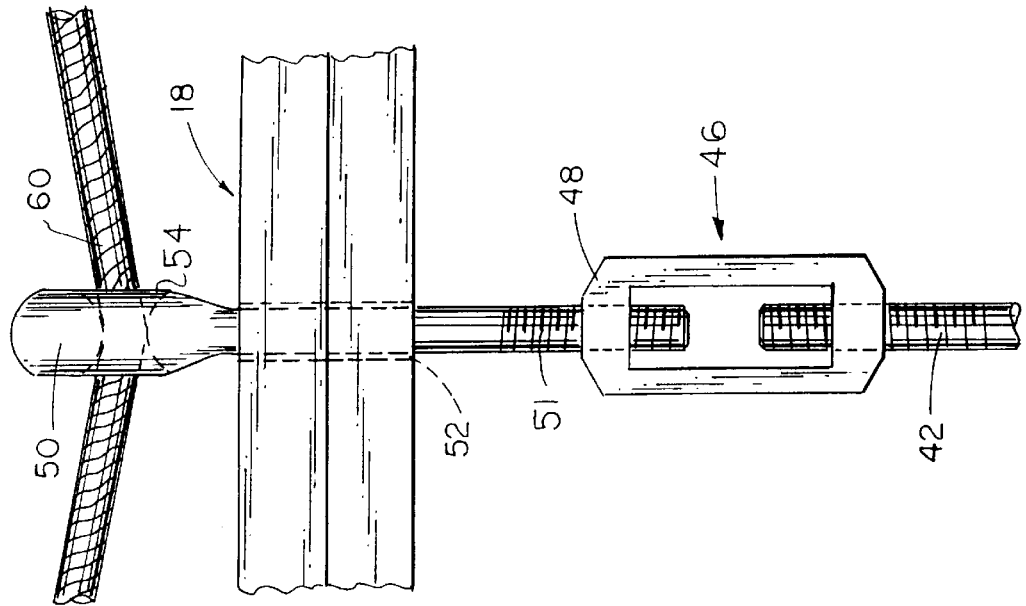
FIG. 4 is an elevational detail view of a region such as that indicated as 4 in FIG. 1, albeit a longer eyebolt is shown in FIG. 4 than in FIG. 1.
Figure 3:
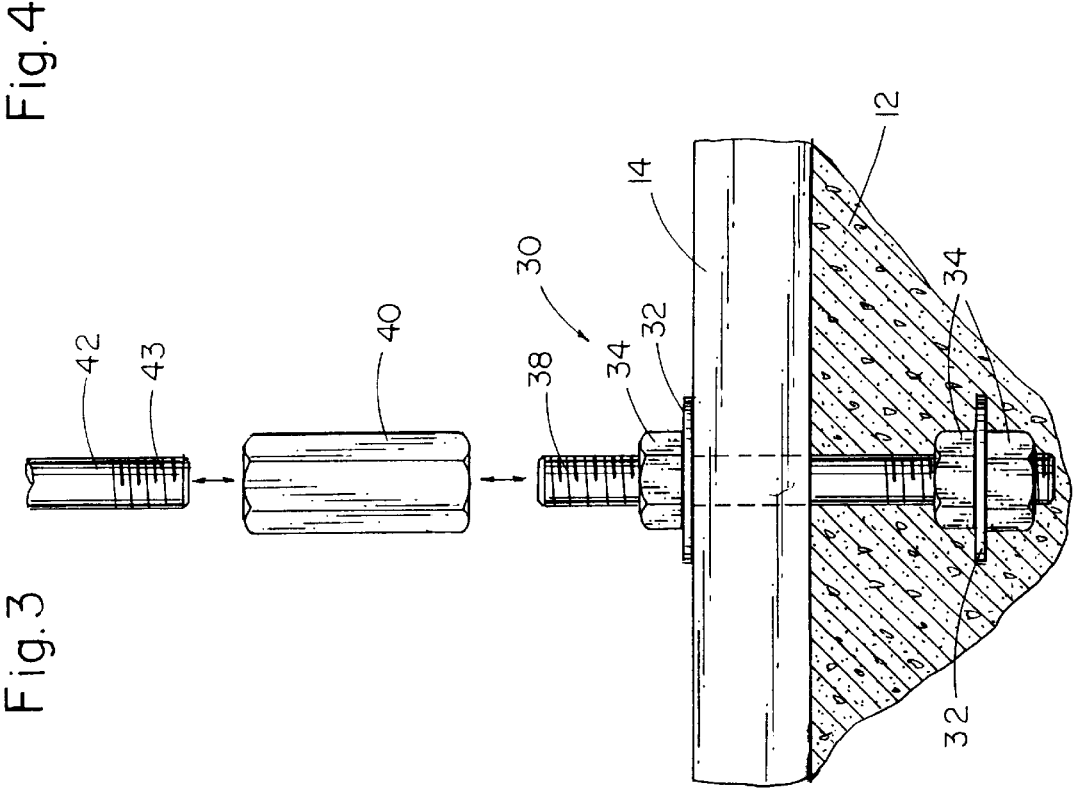
FIG. 3 is an elevational detail view of the region indicated as 3 in FIG. 1

Turning now to FIG. 4, one finds a detailed view of a preferred arrangement for connecting the top end of a vertical tensile fastener 46 comprising a vertical rod 42, a turnbuckle body 48, and an eyebolt 50 to a portion of a top plate 18. In this arrangement the eyebolt 50 is inserted through a throughhole 52 on the center line of the top plate so that a threaded lower portion 51 of the eyebolt 50 can engage the turnbuckle body 48. As is known in the art, the threads on the ends of the rod 42 and eyebolt 50 are chosen to have opposite handedness (e.g., the rod may have conventional right-hand threads, while the eyebolt has left-hand threads) so that when the turnbuckle body 48 is turned in an appropriate direction the eyebolt is drawn down into contact with the top plate 18, thereby applying tension to a flexible tensile member 60, which is preferably an aircraft cable threaded sequentially through each of the eyebolts. In one preferred embodiment the eyebolt 50 differs from a conventionally formed eyebolt in having an eye 54 that is a complete closed circle, as is depicted in FIG. 5. This circle, which may be provided by welding a formed eyebolt ensures that the aircraft cable 60 can not escape from the eye 54 when the eyebolt 50 is drawn downwards. It will be recognized by those skilled in the art that a wide variety of shapes for the eye 54 could be used. For example, if one were to employ a flat metal band as the flexible tensile member 60 that runs along the top plate 18, one could employ an eye having a triangular shape comprising a horizontally disposed top leg having a length according with the width of the tape.

Although an eyebolt of the size normally considered for tie down applications might have an overall length of eight to ten inches, it is sometimes preferred in the present invention to employ an eyebolt 50 having a longer tail portion 51 so that the overall length is about two and one half feet. This choice permits the turnbuckle body 48 to be at a more comfortable working height, and allows a worker to turn the turnbuckle body 48 without having to stand on a ladder, as he or she would have to do if a conventional eyebolt were used.

In between two adjacent ones of a plurality of vertical tensile fasteners 46, the flexible tensile member 60 passes over, and thereby captures, one or more roof framing members 22. Hence, applying tension to the vertical tensile fasteners 46 also tenses the flexible tensile member 60, which acts to hold the captured roof framing member(s) 22 down against the top plate. Thus, if the roof 20 is subjected to an upward force, such as commonly occurs during strong wind storms, this force is transferred, by means of the flexible tensile member 60 and vertical tensile fasteners 46 to anchors 30 beneath the wall. Although FIG. 1 depicts a case in which two roof framing members 22 are captured by a wire rope 60, the actual number of captured framing members is expected to vary. Increasing the spacing between adjacent tensile fasteners 46 reduces both the effectiveness and the cost of the tie down 10. Tests indicate that resisting the range of wind speeds specified in various building codes, will involve spacing the vertical tensile fasteners 46 so that either two or three trusses or other roof framing members are captured by the flexible tensile member 60.

It may be noted that although the preferred embodiment uses a wire rope or aircraft cable sequentially passing through sequential ones of a plurality of eyebolts that can be drawn downward by a turnbuckle, many other similar approaches can be envisioned. For example, a chain, perforated metal tape, metal strap, or nylon strap could be used instead of the wire rope, and the size and strength rating of the flexible member could, of course, be selected to accord with the strength requirements imposed by various building codes. In the preferred embodiments, aircraft cable having a diameter between one quarter and three quarters of an inch is employed as the flexible tensile member. Moreover, there are many known means of engaging an elongate flexible tensile member at a plurality of locations along its length and applying, at each of these locations, a force perpendicular to the axis of the elongate flexible tensile member. For example, one could use a rebar rod and jamming clamp, as taught by Lung et al. in U.S. Pat. No. 5,570,549, which would allow one to reduce the overall length of the vertical fastener by driving the rebar rod further into the clamp and thereby increasing the tension in a flexible tensile member engaged by an attachment means comprising a suitable head structure formed on an upper end of the rebar.

In a preferred embodiment of the invention, a notch 62 is formed in the top of each captured truss 22 at a predetermined location along its length. The location is selected to ensure that when the truss is installed, the notch 62 is directly above a center line 28 of the wall 10. The flexible tensile member 60 may be laid in these notches when it is run along the length of the wall. This practice ensures that the net result of applying tension to the flexible tensile member is a downward force acting to secure the captured framing members to the anchors. Moreover, it is noted that laying a wire rope in a series of notches is easier than alternate procedures taught in the prior art, such as threading the rope through a throughhole cut into each rafter, and therefore allows the tie down apparatus 13 to be installed at a lower labor cost.

In attaching the flexible tensile member to one of the vertical tensile fasteners that is not at the end of a wall (eg., as depicted in FIG. 4) the force imposed on the attachment means portion of the vertical tensile fastener is all directed vertically. The horizontal force components, i.e., the tension in the wire rope, balance. Hence in a preferred embodiment, an eyebolt 50 is used as the attachment means at these locations. Adjacent the end of a wall 10, i.e., at the effective end of the flexible tensile member 60, an end attachment means attaching the flexible tensile member to the vertical tensile fastener must sustain a horizontal force equal to the applied tension in the flexible tensile member. This end attachment means 60 is preferably attached to the top plate at two locations along the center line thereof, and provides a yoke or loop 63 aligned with the centerline of the top plate so that an end portion of the flexible tensile member can be passed through the loop to connect the flexible tensile member to the end attachment means.

After using and bending several eyebolts at the end of wire rope runs, the inventors developed the preferred cable end attachment means 64 depicted in FIG. 6. Turning now to FIG. 6, one finds a U-bolt 66 having two legs of different lengths, each of the legs inserted through a respective throughhole 52 spaced out along the center line of the top plate 18. The longer of the two legs 68 is threadably attached to a turnbuckle body 48 so that the U-bolt can be drawn downward. The shorter leg 70 is threaded so that a conventional nut 34 and washer 32 can be used to clamp it to the top plate 18. As discussed hereinbefore with respect to the eyebolt 50, the preferred U-bolt has a left handed thread formed on the longer leg 68 so that it can operate with the turnbuckle body, while the shorter leg 70 preferably has a right handed thread so that it can be clamped with a conventional right-hand threaded nut 34.

In the preferred cable end attachment means 64 the U-bolt 66 engages a loop 72 formed by the well known process of doubling an end of the wire rope 60 back upon itself and clamping it to itself with one or more wire rope clips 74.

From the foregoing, it can be seen that the invention provides a preferred method of securing a wall to a foundation so as to resist severe wind loads and other stresses tending to detach the roof from the wall, the method comprising the steps of:
 a) fixedly attaching each of a plurality of anchor bolts to a foundation so that each presents a vertically oriented threaded upper end. These anchor bolts are spaced out along the center line of the wall.
 b) placing a sill or frame foot member on the foundation so that each of the anchor bolts extends through a respective throughhole in the sill.
 c) threadably connecting a rod having a length less than the distance between the sill and a top plate of the wall to the upper end of each anchor bolt by suitable connection means, which may comprise a connecting nut.
 d) threadably connecting a lower end of a turnbuckle housing to an upper end of each rod.
 e) for each rod that is not at an end of the wall, inserting an eyebolt through a throughhole in the top plate and threadably attaching the eyebolt to the upper end of the respective turnbuckle housing
 f) for each rod that is at an end of the wall, inserting a U bolt through two throughholes in the top plate arranged so that one of the two U bolt legs can be threadably attached to the upper end of the respective turnbuckle housing and so that a nut can be threadably attached to the other leg of the U-bolt.
 g) passing a wire rope sequentially through each of the eyebolts from one end of the wall to the other. In between any two adjacent ones of the eyebolts the wire rope passes over and captures whatever trusses are there disposed on the top rail. In the preferred method, a notch in each truss above the center line of the wall is used to ensure that the force applied to the roof framing member by the apparatus of the invention is vertically directed.
 h) forming, at each end of the wire rope, a loop that engages the respective U-bolt, the wire rope being drawn taut while forming the second of the two loops, thereby providing a taut section of wire rope extending along the wall from one end to the other, the wire rope capturing all trusses or horizontal sustaining members supported by the wall.
 i) tightening each of the turnbuckles so as to apply tension to the wire rope and to thereby secure the captured structural members to the foundation.

Although the present invention has been described with respect to several preferred embodiments, many modifications and alterations can be made without departing from the invention. Accordingly, it is intended that all such modifications and alterations be considered as within the spirit and scope of the invention as defined in the attached claims.

What is claimed is:

1. In a top plate tie down apparatus connecting a top plate of a wall to a plurality of anchors disposed beneath the wall by means of a plurality of vertical tensile fasteners spaced out along the wall, an improvement comprising a flexible tensile member disposed along the wall above the top plate, the flexible tensile member attached to a respective attachment means portion of each vertical tensile fastener, a portion of the flexible tensile member disposed above a roof framing member disposed upon the top plate intermediate two adjacent ones of the vertical tensile fasteners the flexible tensile member further comprising an end attached to an attachment means portion comprising a U-bolt having two legs, each of the two legs separately inserted through respective vertical throughholes disposed along a centerline of the top plate.

2. The improved tie down apparatus of claim 1 further comprising a second roof framing member intermediate the two adjacent vertical tensile fasteners, wherein a second portion of the flexible tensile member is disposed above the second roof framing member.

3. The improved tie down apparatus of claim 1 wherein the attachment means portion of each of the two adjacent vertical tensile fasteners comprises a respective eye portion of a respective eyebolt and wherein the flexible tensile member is threaded sequentially through each of the portions.

4. The improved tie down apparatus of claim 1 wherein the roof framing member comprises a notch in an upper surface thereof, the notch disposed above a centerline of the top plate, the flexible tensile member disposed in the notch.

5. The improved tie down apparatus of claim 1 wherein the wall is a wood frame wall extending upward from a sill disposed on a concrete foundation, the sill having a plurality of throughholes therethrough, and wherein a threaded portion of each anchor extends through a respective one of the throughholes.

6. The improved tie down apparatus of claim 1 wherein each of the vertical tensile fasteners comprises a length adjustment means.

7. The improved tie down apparatus of claim 6 wherein the length adjustment means comprises a turnbuckle body connecting the attachment means portion to a rod having a threaded upper end.

8. A method of attaching a first predetermined number of roof framing members transverse to and disposed upon a top plate of a wall to a second predetermined number of anchors disposed beneath the wall, the method comprising the steps of:

a) providing the second predetermined number of throughholes in the top plate, each of the throughholes disposed above a respective one of the anchors;

b) installing the second predetermined number of vertical tensile fasteners, each of the vertical tensile fasteners comprising length adjustment means, each of the vertical tensile fasteners comprising an attachment means at an upper end thereof, each of the attachment means extending through a respective one of the throughholes in the top plate, each of the vertical tensile fasteners attached, adjacent a lower end thereof, to a respective one of the anchors;

c) attaching a flexible tensile member sequentially to each of the attachment means so that the flexible tensile member is disposed along the wall above the top plate and so that a respective portion of the flexible tensile member is disposed above each of the first plurality of roof framing members;

d) operating ones of the length adjustment means to reduce the length of respective ones of the vertical tensile fasteners and thereby to draw the flexible tensile member downward so that each of the roof framing members is captured between the flexible tensile member and the top plate.

9. The method of claim 8 wherein each of the attachment means comprises an eye portion of an eyebolt and wherein each of the length adjustment means comprises a turnbuckle body threadably attached to a respective eyebolt.

10. The method of claim 8 wherein the flexible tensile member comprises a wire rope and wherein each of the attachment means comprises an eyebolt.

11. The method of claim 8 wherein each of the roof framing members comprises a notch in an upper surface thereof and wherein step c) comprises placing the respective portion of the flexible tensile member into each of the notches.

12. The method of claim 8 wherein in step c) the respective portion of the flexible tensile member is disposed above two of the roof framing members between two adjacent ones of the attachment means.

13. The method of claim 8 wherein in step b) each of the vertical tensile fasteners is attached adjacent the lower end thereof to the respective anchor by means of a connecting nut engaging a first threaded portion on the anchor and a second threaded portion on the vertical tensile fastener, the second threaded portion having a length equal to one half the length of the connecting nut.

14. Apparatus attaching a roof framing member to a top plate of a wall, the framing member comprising a notch in an upper surface thereof, the notch disposed above a centerline of the wall, the apparatus comprising:

an elongate flexible tensile member disposed along the center line of the wall above the top plate, a portion of the flexible tensile member disposed in the notch;

two eyebolts, each disposed above the top plate on respective sides of the roof framing member, each of the two eyebolts attached to a respective portion of the flexible tensile member; and a turnbuckle body threadably connected to each of the eyebolts for applying a tension to the flexible tensile member by drawing the respective attached portions of flexible tensile member downward.

15. The apparatus of claim 14 wherein each of the eyebolts is connected to a respective anchor disposed beneath the wall.

16. The apparatus of claim 14 wherein an end of the flexible tensile member is attached to a U-bolt having two legs, each of the legs respectively extending through a separate throughhole in the top plate.

17. Apparatus tying a plurality of roof framing members disposed above a top plate of a wall to the top plate, the apparatus comprising a flexible tensile member having a respective portion disposed above each of the plurality of roof framing members, the flexible tensile member having an end portion; and an end attachment means attached to the top plate at two locations spaced out along the centerline thereof, the end attachment means comprising a loop engaging the end portion of the flexible tensile member.

18. The apparatus of claim 17 wherein the end attachment means comprises a U-bolt having two legs separately inserted through two throughholes spaced out along the centerline of the top plate.

19. The apparatus of claim 17 wherein the flexible tensile member comprises a wire rope, and wherein the end portion of the wire rope comprises a second loop adapted to engage the first loop so to attach the wire rope to the end attachment means.

20. A top plate tie down apparatus connecting a top plate of a wall to a concrete foundation, the wall extending upward from a sill disposed on the concrete foundation, the sill having a plurality of throughholes therethrough, the apparatus comprising:

a plurality of anchors, each anchor having a respective lower portion disposed beneath the wall, each anchor having a respective upper threaded portion extending through a respective one of the throughholes in the sill, each anchor having a respective first nut threaded onto the upper portion thereof so as to secure the sill to the foundation;

a predetermined number of vertical tensile fasteners, each of the vertical tensile fasteners comprising a respective eye disposed above the top plate, each of the vertical tensile fasteners further comprising a threaded portion at a lower end thereof, each of the threaded portions having a predetermined length;

the predetermined number of connecting nuts, each of the connecting nuts having a length equal to twice the predetermined length, each of the connecting nuts having a first end threaded onto a respective one of the anchors above the respective first nut, each of the connecting nuts having a second end threaded onto the threaded portion of a respective one of the vertical tensile fasteners;

a flexible tensile member disposed along the wall above the top plate, the flexible tensile member attached to the respective eye of each vertical tensile fastener, a portion of the flexible tensile member disposed above a roof framing member disposed upon the top plate intermediate two adjacent ones of the vertical tensile fasteners.

* * * * *